Patented June 30, 1925.

1,544,196

UNITED STATES PATENT OFFICE.

CLARK S. TEITSWORTH, OF LOMPOC, CALIFORNIA, ASSIGNOR TO THE CELITE COMPANY, OF LOS ANGELES, CALIFORNIA, A CORPORATION OF DELAWARE.

HEAT-INSULATING COMPOSITION.

No Drawing. Application filed April 8, 1924. Serial No. 705,125.

*To all whom it may concern:*

Be it known that I, CLARK S. TEITSWORTH, a citizen of the United States, residing at Lompoc, in the county of Santa Barbara and State of California, have invented an Improved Heat-Insulating Composition, of which the following is a specification.

This invention relates to the preparation of a heat insulating composition suitable for use as a covering for boilers, steam pipes, heated walls, storage tanks and all other equipment or apparatus of a similar character. The object of my invention is to produce a strong, light weight, porous, plastic and heat resisting material which is economic in manufacture, convenient in application and efficient in use.

It is well known that diatomaceous earth, otherwise known as infusorial earth, tripoli, kieselguhr or Sil-O-Cel, has a lower heat conductivity than any other mineral, and is highly resistant to high temperatures, being free from shrinkage and disintegration at temperatures of 1600° F. and above. Heat insulating materials in the form of brick, powder, bonded blocks and plastic cements have been made from diatomaceous earth. The plastic cements made therefrom have had one or all of the following disadvantages: they had poor adhesion, were bonded with soluble substances, often comprised alkalies or other injuries and objectionable constituents from the workman's point of view, necessitated the application of two or three different coats, were costly, weak, etc. I have developed a heat insulating composition which has practically none of these disadvantages.

I have found that a composition consisting of diatomaceous earth, Portland secent and an organic gum, together with a fibrous material, produces an excellent heat insulating composition which has all of the desirable characteristics.

Heretofore some difficulty has been experienced when it was desirable to apply a plastic insulating cement upon the surface of a wall made of porous, water absorbing brick or insulating blocks such as insulating brick having artificially induced porosity by burning out of organic matter or blocks of diatomaceous earth. There has always been a marked tendency for these brick or blocks to adsorb water from the plastic cement and thereby reduce the plasticity thereof, so that the mass could not be applied or troweled into place easily or finished off so as to present a smooth surface. The adding of excessive amounts of water to overcome this adsorption by the brick, reduced the consistency of the plastic mass to such a degree that it was unworkable and also gave rise to serious shrinkage upon drying, which resulted in cracks and checks. In order to overcome these objectionable features, I use an organic gum in my plastic composition which forms a priming or sizing agent in the mass and coats the surfaces to which the plastic cement is to be applied with an impermeable adhesive which does not allow, or allows only slowly, the water used in the plastic cement to become absorbed by the surface on which it is placed.

Another desirable property of my plastic composition is the increased strength and resistance to mechanical shock and abrasion. A number of plastic heat insulating compositions now on the market, are good insulators, but present a very weak surface, so that hammering, shock or abrasion, causes cracks and disintegration of the material. Since these compositions are primarily used to insulate against heat losses, the existence of cracks formed either during drying or by mechanical shock, is very detrimental as large amounts of heat are lost therethrough. A composition made in accordance with my invention presents a hard, firm and strong surface, which has considerable mechanical strength. The presence of a large proportion of diatomaceous earth in any composition insures excellent heat retaining qualities.

As one of the ingredients in my composition, I prefer to use a type of vegetable gum similar to that obtained as an excretion of certain trees, such as *Astragalus gummifer* Lab., *Streculia urens* Roxb., *Streculia tragacanth* Lind., or species of Coblaspermum. These gums are imported under the names of Karaya, Maura and Kadaya gum, Kuteragumi, Moringagummi and gum tragacanth and I refer to this general type of gum, that is a gum which consists in a plant exudation, whenever I mention gum Karaya in the following description and claims.

These gums are imported from the Orient in crude form and are most often contaminated with bark, dirt and other foreign matter. The gums are received in a coarse, lumpy form and may be ground to a fine powder for use, or may be purified and then ground. These gums are capable of taking up or imbibing large quantities of cold water to form gels. Any organic gum having the property of swelling up in water or taking up such water to form a hydro-gel, may be used, as it is this property of the gum upon which the advantages of its use in this connection depend.

The ability of these gums to absorb large quantities of water and form a hydro-gel, or gelatinous, slimy, semi-solid, which I utilize to develop the plasticity of my composition, retain the water or seal the pores of the surface upon which the cement is applied, plays an important part in my invention. I have found that powdered gums will more readily swell in water and will absorb larger quantities of water and for this reason I prefer a powdered gum, although I am not to be limited to any particular mesh of product.

I have also found that the addition of small amounts of various chemicals is desirable in order to improve the gel-forming properties of the gum and have used sodium carbonate (soda ash), sodium chloride, or sodium silicate with great success. Salts or chemicals which have this property of increasing the ability of colloidal substance to take up water and form a gel or of increasing the rapidity with which such water is absorbed are known as distending agents. Some chemicals impair the ability of the gum to form a gel with water, but it is not possible for me to define any definite class of salts or chemicals as the preferred group; as an example, calcium hydrate and caustic soda impair the effect of the gum on priming effect, although an alkaline material such as sodium carbonate gives very good results.

A form of plastic heat insulating composition which is very efficient may be made by mixing dry, about 67 per cent of disintegrated diatomaceous earth, about 20 per cent of Portland cement, about 10 per cent asbestos or other fibrous material and about 3 per cent gum karaya. By adding sufficient water to give a mixture of the required consistency for application with a trowel or spray device, the material is ready for use. For coatings up to $\frac{1}{2}''$ in thickness, it may be applied in a single coat and allowed to dry slowly, but where a greater thickness is desired, the first $\frac{1}{2}''$ coat may be covered with chicken wire mesh or the like and another $\frac{1}{2}''$ superimposed. Blocks of this material, after drying, weigh only twenty-five pounds per cubic foot, are very hard and resistant to mechanical shock and show only slight losses in strength when heated to 1000° F.

The composition may be varied within rather wide limits without departing from the spirit of the invention. For example, a composition containing 70 per cent diatomaceous earth, 15 per cent Portland cement, 3 per cent gum karaya, 4 per cent $Na_2CO_3$ or other peptizing agent and 8 per cent asbestos or vegetable fiber, gives very good results. I prefer to use from 50 to 85 per cent of diatomaceous earth, as the heat insulating ability depends upon this ingredient, but I may substitute other binding agents, such as plaster of Paris, or basic magnesia, for my Portland cement binder, with satisfactory results. In all instances, however, gum karaya or some other organic gum of the character described is used in amounts of from $\frac{1}{2}$ to 20 per cent by weight, although the use of fibrous material or a distending agent may in some cases be dispensed with.

Although my composition is primarily designed to cover a plastic heat insulating cement, the compositions disclosed in my invention may be utilized in the production of moulded blocks or shapes to be used for heat insulating purposes.

Furthermore although I have disclosed a dry mixture of ingredients, the scope of my invention also includes mixtures such as disclosed herein, to which enough water has been added to give the mass the required consistency, and also blocks, slabs, coatings or other formed bodies made from the above described compositions.

My improved heat insulating composition therefore consists of an inorganic heat insulating material, a binding agent, and an organic gum, to which may be added in some cases a fibrous material, or a distending agent, or both; and my invention includes any heat insulating composition formed by mixing such materials dry, or by addition of water thereto in any suitable proportion, whether such compositions be applied as plastic coatings, moulded blocks or in any other fashion. As a heat insulating material I prefer to use diatomaceous earth or tripoli; as a binding agent any suitable material may be used, for example Portland cement, plaster of Paris, or basic magnesia; and as an organic gum I prefer to use a vegetable gum capable of forming a gel with water, including any of those mentioned above. The fibrous material used may be asbestos, manila fiber, hair, wood fiber, or any kind of fiber which may assist in giving mechanical strength to the composition. As examples of a distending agent, I have used sodium carbonate, sodium chloride or sodium silicate, but I do not wish to limit myself to the use of sodium salts, as any salt or other agent which improves the gel-forming properties of the gum may be used.

What I claim is:

1. A heat insulating composition comprising diatomaceous earth, a binding agent, an organic gum capable of forming a gel with water and a fibrous material.

2. A heat insulating composition comprising diatomaceous earth, a binding agent, an organic gum capable of forming a gel with water, a fibrous material, and a distending agent.

3. A heat insulating composition comprising diatomaceous earth, a binding agent, and gum karaya.

4. A heat insulating composition comprising diatomaceous earth, a binding agent, gum karaya and a fibrous material.

5. A heat insulating composition comprising diatomaceous earth, a binding agent, gum karaya, a peptizing agent and a fibrous material.

6. A heat insulating composition comprising diatomaceous earth, Portland cement and gum karaya.

7. A heat insulating composition comprising diatomaceous earth, Portland cement, gum karaya and a fibrous material.

8. A heat insulating composition comprising about 67 per cent diatomaceous earth, 20 per cent Portland cement, 3 per cent gum karaya and 10 per cent fibrous material.

9. A heat insulating composition comprising an inorganic heat insulating material, a binding agent, a gum capable of forming a gel with water, and a distending agent.

10. A heat insulating composition comprising diatomaceous earth, a binding agent, and a gum consisting of a plant exudation and capable of forming a gel with cold water.

11. A heat insulating composition comprising diatomaceous earth, Portland cement, and a gum capable of forming a gel with water.

12. A heat insulating composition containing an inorganic heat insulating material, a binding agent, and gum karaya.

13. A heat insulating composition containing an inorganic heat insulating material, a binding agent, gum karaya, and a fibrous material.

In testimony whereof I have hereunto subscribed my name this 29th day of March 1924.

CLARK S. TEITSWORTH.